United States Patent [19]

Mechlenburg

[11] Patent Number: 4,724,311

[45] Date of Patent: Feb. 9, 1988

[54] VARIABLY TRANSMISSIVE FILTER

[75] Inventor: Douglas M. Mechlenburg, Erie, Pa.

[73] Assignee: American Sterilizer Company, Erie, Pa.

[21] Appl. No.: 798,768

[22] Filed: Nov. 15, 1985

[51] Int. Cl.⁴ ............................. G01J 1/24; G02F 1/13
[52] U.S. Cl. ................................. 250/201; 250/205; 350/339 F
[58] Field of Search ............................ 250/201–205, 250/213 R, 213 A, 213 VT; 313/524; 350/333, 339 F, 342

[56] References Cited

U.S. PATENT DOCUMENTS

| | | | |
|---|---|---|---|
| 3,655,269 | 4/1972 | Heilmeier | 350/333 |
| 3,944,817 | 3/1976 | Hilsum et al. | 350/342 X |
| 3,986,022 | 10/1976 | Hyatt | 250/205 |
| 4,155,122 | 5/1979 | Budmiger | 350/339 F X |
| 4,601,537 | 7/1986 | Saccocio | 350/342 X |

Primary Examiner—Eugene R. LaRoche
Assistant Examiner—David Mis
Attorney, Agent, or Firm—Kirkpatrick & Lockhart

[57] ABSTRACT

A variably transmissive filter is comprised of a plurality of adjustable transmissive elements for receiving incident radiation. A circuit is responsive to the incident radiation for providing an indication of the intensity thereof. Another circuit adjusts the degree of transmission of the elements in response to the intensity of the incident radiation such that the amount of incident radiation transmitted through the elements is controlled.

8 Claims, 6 Drawing Figures

VARIABLY TRANSMISSIVE FILTER

BACKGROUND OF THE INVENTION

1. Field of the Invention

The present invention is directed generally to filters and more particularly to filters whose transmission characteristics may be varied.

Appparatus such as image intensifiers are used in a variety of applications including military, surveillance, underwater photography, and other applications where the amount of available light may be insufficient for the desired purpose. In U.S. Application Ser. No. 727,748, filed Apr. 26, 1985, and assigned to the same assignee as the present invention, it is suggested to use an imaging apparatus for intensifying the illumination reflected from a surgical site. The illumination reflected from the surgical site itself is on the order of one to five hundred footlamberts. However, the illumination reflected from objects surrounding the surgical site, such as cotton swabs, retractors, etc. may range anywhere from three hundred fifty footlamberts to two thousand nine hundred footlamberts. Because image intensifiers typically have a gain on the order of fifty thousand, when an image intensifier is adjusted to provide a proper image of the surgical site, the image intensifier may be damaged or burned out by illumination reflected by a retractor or the like. For this reason, image intensifiers have not heretofore been acceptable in surgical applications.

SUMMARY OF THE PRESENT INVENTION

The present invention is directed to a variably transmissive filter comprised of a plurality of adjustable transmissive elements for receiving incident radiation. Detectors are responsive to the incident radiation for providing an indication of the intensity thereof. Means are provided for adjusting the degree of transmission of the elements in response to the intensity of the incident radiation such that the amount of incident radiation transmitted through the elements is controlled.

According to another aspect of the present invention, a variably transmissive electronic filter is comprised of a plurality of adjustable transmissive elements for receiving incident radiation. A plurality of detectors is responsive to the incident radiation. A circuit is provided which is responsive to the detectors for producing a signal related to the intensity of the incident radiation. A processor compares the signal related to the intensity of the incident radiation to a reference signal and produces an output signal in response to the comparison for adjusting the degree of transmission of the elements such that the amount of incident radiation transmitted through the elements is controlled.

The present invention is also directed to a method for controlling the transmission of radiation. The method is comprised of the steps of inputting incident radiation to a plurality of adjustable transmissive elements. A signal representative of the intensity of the incident radiation is produced. The degree of transmission of the elements is adjusted in response to the signal representative of the intensity of the incident radition.

The variably transmissive filter of the present invention may be used, for example, in combination with an image intensifier. Such an apparatus provides all of the benefits of providing an enhanced image in response to low intensity radiation. However, because of the variably transmissive filter, the imaging apparatus can be used in other applications, such as in surgical applications, wherein the site of interest may be reflecting little radiation while the surrounding area is reflecting a large amount of radiation. This represents a substantial advantage over the prior art. These and other advantages and benefits of the present invention will become apparent from the description of a preferred embodiment hereinbelow.

BRIEF DESCRIPTION OF THE DRAWINGS

In order that the present invention may be clearly understood and readily practiced, preferred embodiments of the present invention will now be described, by way of example only, with respect to the accompanying figures wherein.

DESCRIPTION OF A PREFERRED EMBODIMENT

Figure 1:
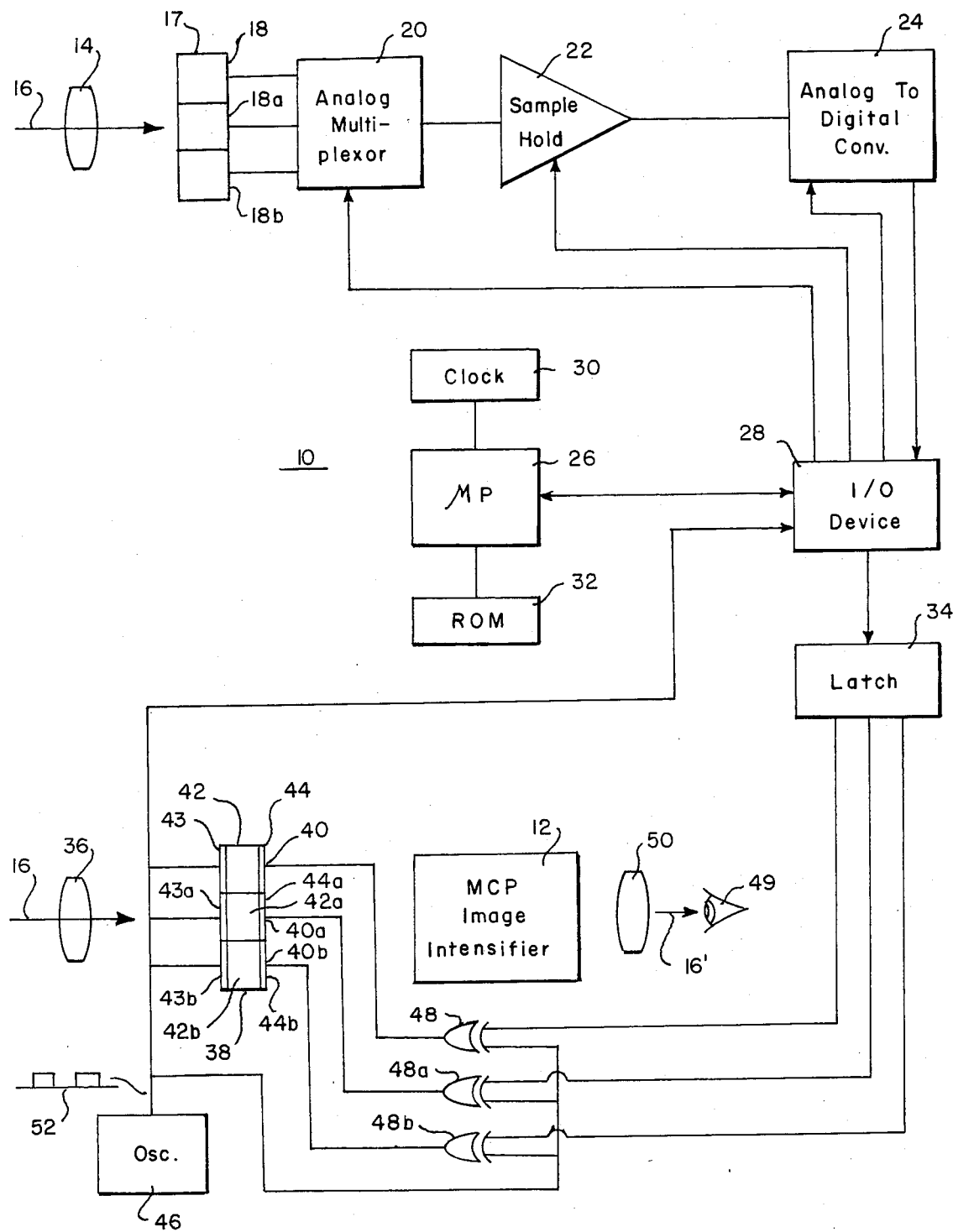
FIG. 1 illustrates a variably transmissive filter constructed according to the teachings of the present invention shown in combination with an image intensifier.

In FIG. 1, a variably transmissive filter 10 constructed according to the teachings of the present invention is illustrated in conjunction with a microchannel plate intensifier 12 (hereinafter MCP image intensifier 12). Although the variably transmissive filter 10 is illustrated in FIG. 1 in combination with the MCP image intensifier 12, it should be recognized that the variably transmissive filter 10 of the present invention may be used in combination with other devices. Therefore, the variably transmissive filter 10 is illustrated in FIG. 1 in combination with the MCP image intensifier 12 for purposes of illustration only.

In FIG. 1, a first objective lens 14 receives incident radiation 16 and focuses same on an array 17 of photodetectors 18, 18a. and 18b. The photodetectors 18, 18a, 18b may be phototransistors, photoresistors or any sensor which converts light into an electrical signal. Although an array 17 of three detectors is illustrated, an array of any size may be constructed.

The signals produced by the photodetectors 18, 18a, and 18b, which may be, for example, voltages, are input to an analog multiplexer 20. The analog multiplexer 20 allows the voltages produced by the photodetectors 18, 18a, and 18b to be individually sampled by a sample-and-hold circuit 22. An analog to digital converter 24 is responsive to the sample- and-hold circuit 22 for producing digital signals responsive to the voltages produced by each of the photodetectors 18, 18a, and 18b. The analog multiplexer 20, sample-and-hold circuit 22, and analog to digital converter 24 may be comprised of any commercially available components and operated according to standard and well-known techniques.

The digital signals produced by the analog to digital converter 24 are input to a microprocessor 26 through an input/output device 28. The microprocessor 26 is responsive to a clock 30 in a well-known manner. A read only memory 32 is provided for storing the operating instructions of the microprocessor 26. The programming of the microprocessor 26 is described in detail hereinbelow in conjunction with FIG. 3. The microprocessor 26 produces signals for controlling the operation of the analog multiplexer 20, sample-and hold circuit 22, and analog to digital converter 24 through the input/output device 28 according to well-known techniques. The microprocessor 26 also produces output signals which are output to a latch 34 through the input-/output device 28. The latch 34 may be any commercially available component compatible with the microprocessor 26 and input/output device 28.

A second objective lens 36 receives the incident radiation 16 and focuses same on an array 38 of adjustable transmissive elements 40, 40a, and 40b. In the embodiment illustrated in FIG. 1, the number of adjustable transmissive elements 40, 40a, and 40b equals the number of photodetectors 18, 18a, and 18b, although that need not always be the case. The adjustable transmissive elements 40, 40a, and 40b may be of any of the known liquid crystal devices which are converted from a transparent state to a translucent state by the modification of an electric field. An example of such a device is a twisted nematic field effect liquid crystal 42, 42a, and 42b available from Hamlin, of Lake Mills, Wis. When using liquid crystals 42, 42a and 42b of this type, vertical polarizers 43, 43a, and 43b are positioned before each of the liquid crystals 42, 42a, and 42b, respectively, and horizontal polarizers 44, 44a, and 44b are positioned after each of the liquid crystals 42, 42a, and 42b, respectively.

When an AC voltage is applied across the liquid crystals 42, 42a, and 42b they become aligned with the electric field and lose their twisted nematic orientation. In this state they lose their ability to rotate light, and the vertically polarized incident radiation 16 is blocked by the horizontal polarizers 44, 44a and 44b. Therefore, transmission through the adjustable transmissive elements 40, 40a, and 40b is a minimum. When the AC voltage across the liquid crystal is reduced to zero, the liquid crystals 42, 42a, and 42b realign themselves into the twisted nematic orientation and are capable of rotating light. Now, the vertically polarized incident radiation 16 is rotated ninety degrees and is transmitted by the horizontal polarizers 44, 44a, and 44b. Transmission in this state is a maximum. By modulating the AC voltage across each the liquid crystals 42, 42a, and 42b the transmission properties of each of the adjustable transmissive elements 40, 40a, and 40b can be varied from a minimum to a maximum.

In FIG. 1, the source of the AC voltage is an oscillator 46 which produces a square wave output signal 52. The square wave 52 is input to the input/output device 28 and is input to each of the liquid crystals 42, 42a, and 42b. The square wave 52 is also input to a first input terminal of a logic gate such as exclusive OR gates 48, 48a, and 48b. Each of the exclusive OR gates 48, 48a, and 48b has an output terminal connected to one of the liquid crystals 42, 42a, and 42b, respectively. A second, or control, input terminal of each of the exclusive OR gates 48, 48a, and 48b is connected to the latch 34. In this manner, the square wave 52 may be controllably applied across any of the liquid crystals 42, 42a, and 42b.

After the incident radiation 36 passes through the adjustable transmissive elements 40, 40a, and 40b it may be input to the MCP image intensifier 12. The MCP image intensifier 12 intensifies the image. The intensified radiation 16' is available to a user 49 through an eyepiece 50.

Figures 2A, 2B, 2C, 2D:
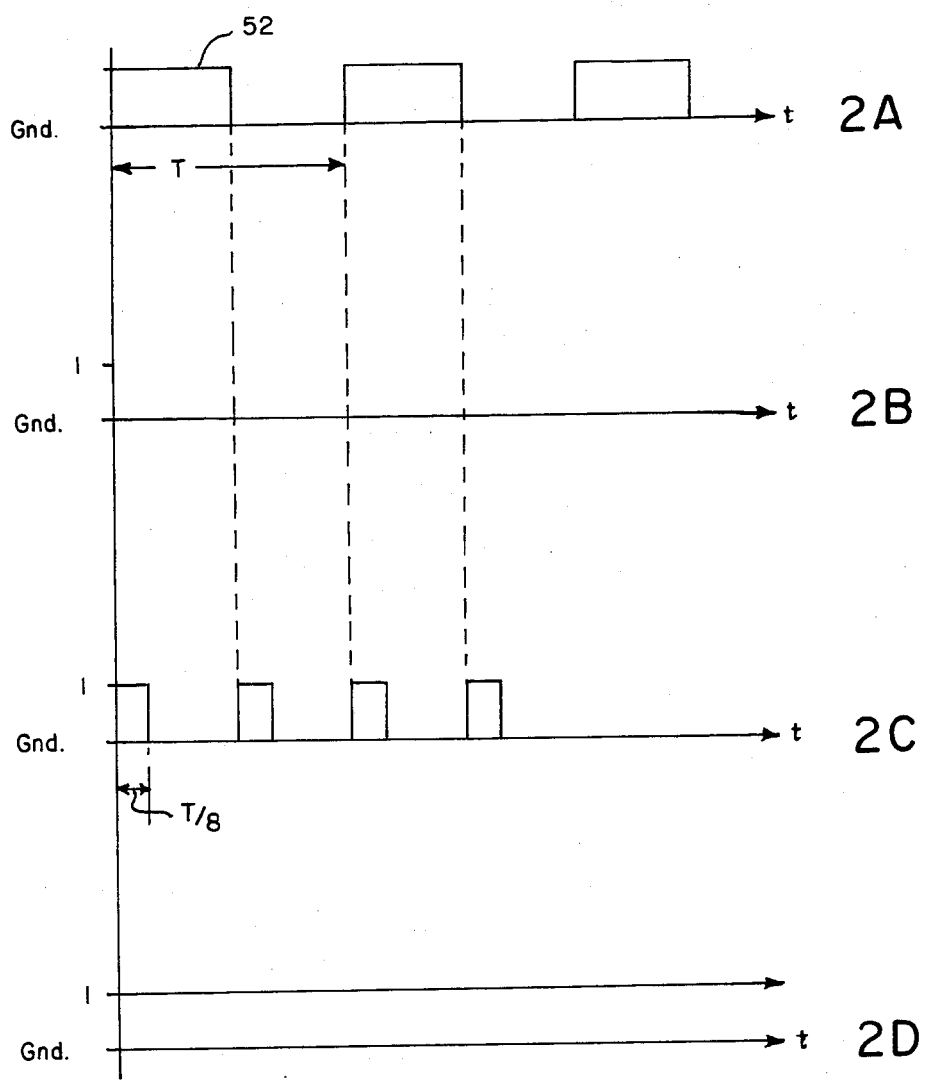
FIGS. 2A through 2D illustrate timing diagrams of the signals produced by the variably transmissive filter shown in FIG. 1.

The operation of the exclusive OR gates 48, 48a, and 48b to control the application of the square wave 52 across the liquid crystals 42, 42a, and 42b, respectively, will now be described in conjunction with FIGS. 2A through 2D. FIGS. 2A through 2D are timing diagrams illustrating various signals produced by the variably transmissive filter 10 illustrated in FIG. 1. FIG. 2a illustrates the square wave 52 produced by the oscillator 46. The square wave 52 is fed to one side of the liquid crystals 42, 42a, and 42b and to one of the input terminals of each of the exclusive OR gates 48, 48a, and 48b. If the microprocessor 26 writes a logic zero as shown in FIG. 2B to the latch 34 for one of the exclusive OR gates, for example, exclusive OR gate 48, the output of the exclusive OR gate 48 follows the square wave 52 and the RMS voltage across the liquid crystal 42 is zero. In this condition, the liquid crystal realigns itself into the twisted nematic orientation and is capable of rotating light such that transmission through the adjustable transmissive element 40 is at a maximum. If a logic one as shown in FIG. 2D is written into the latch 34 for the exclusive OR gate 48, the output of the exclusive OR gate 48 becomes the complement of the square wave 52 and the RMS voltage across the crystal 42 is equal to the logic supply voltage. Under these circumstances, the liquid crystal aligns itself with the electric field and loses its twisted nematic orientation. In this state, it loses its ability to rotate light such that the output of the transmissive element 40 is a minimum.

To achieve transmissive states between the minimum and maximum, a signal as shown in FIG. 2c is output by the latch 34 which controls the time during which the square wave 52 is applied. The signal illustrated in FIG. 2c causes the liquid crystals to be aligned in the twisted nematic orientation for only a portion of the time. Therefore, the amount of polarized incident radiation which is transmitted through the adjustable transmissive elements is varied.

In FIG. 2c, the pulses have the same magnitude as the logic one illustrated in FIG. 2d but are of a limited pulse width. The pulses are, however, synchronized with the square wave 52. The pulse width of the signal illustrated in FIG. 2c is calculated such that one-half of the RMS voltage is applied across the liquid crystals 42, 42a, and 42b. In this manner, one-half of the polarized incident radiation is transmitted through the adjustable transmissive elements 40, 40a, and 40b.

The pulse width of the signal illustrated in FIG. 2c is calculated based on the fact that for an AC square wave, the RMS voltage is equal to the peak voltage. Therefore, $$VRMS = 0 \int_0^{t/8} \frac{V^2}{T} dt = 0\frac{V^2 dt}{T} + \int_{t/2}^{5t/8} \frac{V^2 dt}{T}$$

$$VRMS = \frac{V^2}{T}\left[\frac{T}{8} - 0\right] + \frac{V^2}{T}\left[\frac{5T}{8} - \frac{T}{2}\right]$$

$$VRMS = V\sqrt{\tfrac{1}{8} + \tfrac{1}{8}}$$

$$VRMS = V/2$$

Thus, by providing a signal having a pulse width which is one-eighth of the period of the square wave 52, and in synchronism with the square wave 52, the amount of radiation transmitted through the adjustable transmissive elements is cut in half. Other degrees of transmission may be obtained by providing a signal having an appropriate pulse width.

Figure 3:
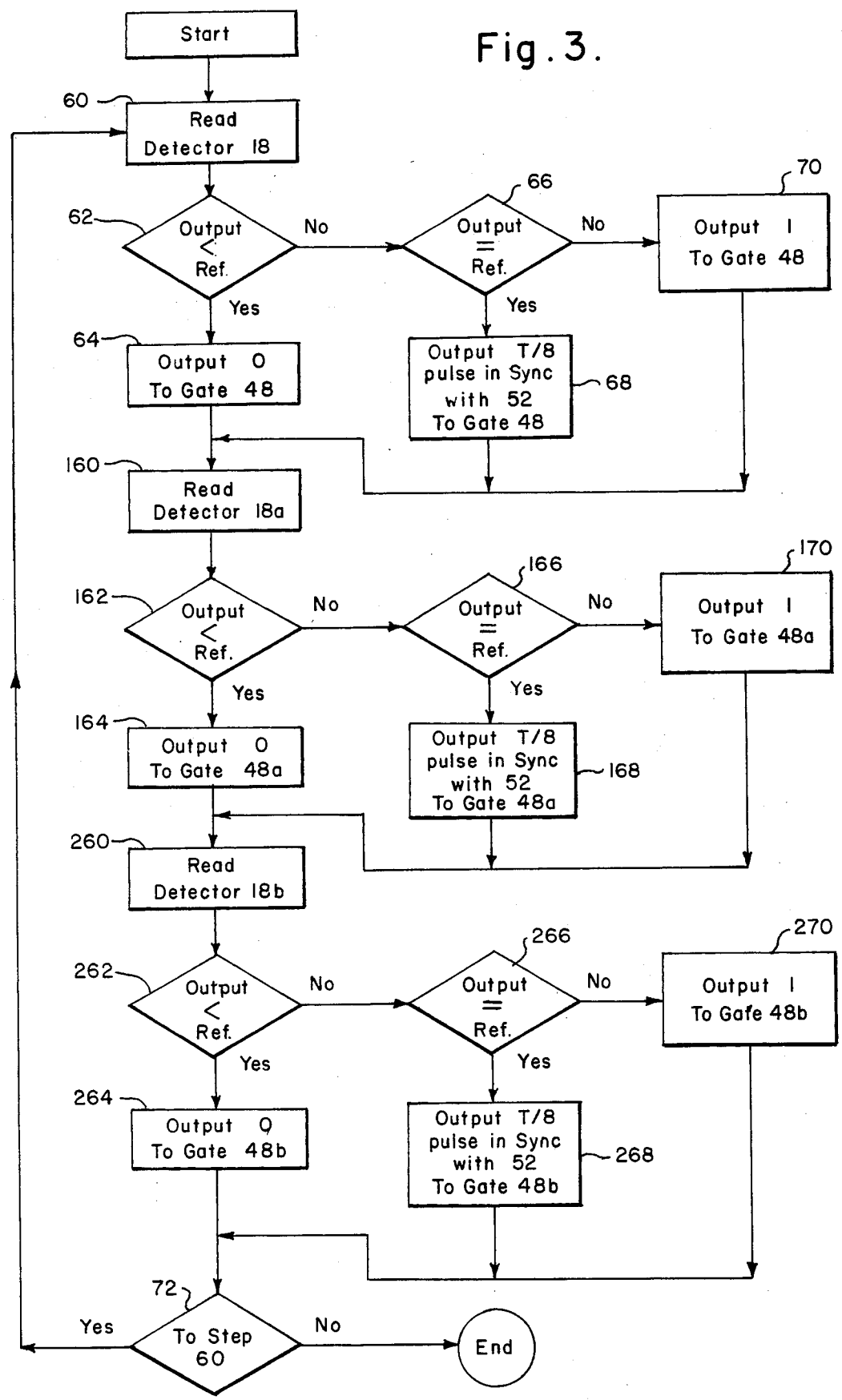
FIG. 3 is a flow chart illustrating the steps performed by the microprocessor of the variably transmissive filter shown in FIG. 1.

FIG. 3 illustrates a flow chart for the steps performed by the microprocessor 26 in controlling the operation of the variably transmissive filter 10 illustrated in FIG. 1. To summarize the steps carried out by the microprocessor 26, when the intensity of the incident radiation 16 is within acceptable limits, the microcprocessor 26 outputs a signal to each of the exclusive OR gates 48, 48a, and 48b which is in sync with the square wave 52 but has a pulse width which is one-eighth of the period of the square wave 52. In this manner, each of the adjustable transmissive elements 40, 40a, and 40b allows approximately one-half of the incident radiation 16 to reach the MCP image intensifier 12. Should one of the detectors, detector 18 for example, indicate that the intensity of the incident radiation is above acceptable limits, the microprocessor 26 outputs a logic level one to exclusive OR gate 48 such that substantially no radiation passes through adjustable transmissive element 40. Conversely, should the detector 18 indicate that the intensity of the incident radiation is below acceptable levels, the microprocessor outputs a logic level zero to exclusive OR gate 48 such that substantially all of the incident radiation passes through adjustable transmissive element 40. It will be readily apparent to those of ordinary skill in the art that a variably transmissive filter 10 may be constructed having transmission levels other than zero, fifty percent, and one-hundred percent. Therefore, the following flow chart is provided for purposes of illustration only.

The flow chart illustrated in FIG. 3 begins at step 60 where the microprocessor 26 reads the digital value corresponding to the signal produced by the photodetector 18 through input/output device 28. The microprocessor 26 then compares the digital value corresponding to the output signal of the photodetector 18 to a predetermined reference value at decision step 62. If the digital value corresponding to the output signal of the photodetector 18 is less than the reference, the microprocessor 26 outputs a zero to latch 34 for gate 48 at step 64. As discussed earlier, when the control input terminal of the gate 48 receives the low signal, adjustable transmissive element 40 will assume a state of maximum light transmission. Thereafter, the microprocessor 26 proceeds to step 160.

If at decision step 62 the microprocessor 26 determined that the output signal of the photodetector 18 was not less than the reference value, the microprocessor then proceeds to decision step 66 to determine if the output signal is equal to the reference value. If the output signal equals the reference value, then the incident radiation 16 is of a proper intensity and the microprocessor 26 outputs a signal having a pulse width of one-eighth of the period of the square wave 52 to latch 34 at step 68 which will be input to the control input terminal of the exclusive OR gate 48. In this manner, the adjustable transmissive element 40 continues to transmit approximately fifty percent of the incident radiation 16.

If at decision step 66 the output signal was not equal to the reference value, then the output signal must be greater than the reference value. In this case, the microprocessor 26 outputs a one to latch 34 at step 70 which is input to gate 48. As discussed hereinabove, the output of a high logic signal renders the adjustable transmissive element 40 nonconductive such that no incident radiation is transmitted therethrough. In this manner, through steps 60, 62, 64, 66, 68, and 70, the microprocessor 26 adjusts the degree of transmission of the adjustable transmissive element 40.

From step 64, step 68, or step 70, the microprocessor proceeds to step 160 wherein the digital value corresponding to the analog signal produced by the photodetector 18a is read. The microprocessor then proceeds through steps 162, 164, 166, 168, and/or 170 as hereinabove described in conjunction with steps 62, 64, 66, 68, and 70, respectively. In this manner, the microprocessor 26 controls the degree of transmission of the adjustable transmissive element 40a through the exclusive OR gate 48a.

From steps 164, 168, or 170, the microprocessor 26 proceeds to step 260 wherein the digital value corresponding to the analog signal produced by the photodetector 18b is read. Thereafter, steps 262, 264, 266, 268, and/or 270, corresponding to steps 62, 64, 66, 68 and 70, respectively, are performed by the microprocessor 26 to thereby control the degree of transmission of the adjustable transmissive element 40b through the exclusive OR gate 48b.

From steps 264, 268, or 270, the microprocessor 26 proceeds to decision step 72. At step 72, the microprocessor 26 determines if the program is to be repeated. If the program is to be repeated, the microprocessor returns to step 60. If the program is not to be repeated, the microprocessor exits the program. Those of ordinary skill in the art will recognize that the program illustrated in FIG. 3 may be expanded to control an array 38 of adjustable transmissive elements 40, 40a, and 40b of any size. The frequency with which the transmission of each adjustable transmissive element 40, 40a, and 40b is adjusted will be determined by the desired degree of protection as well as the size of the array 38.

While the present invention has been described in connection with an exemplary embodiment thereof, it is understood that the present invention need not be used in conjunction with an imaging apparatus. Additionally, it is further understood that many modifications and variations of the present invention will be readily apparent to those of ordinary skill in the art. This disclosure and the following claims are intended to cover such modifications and variations.

What is claimed is:

1. A variably transmissive filter comprising:
   a plurality of electrically adjustable, twisted nematic field effect liquid crystal elements for receiving incident radiation;
   an equal number of detectors responsive to the incident radiation for providing an indication of the intensity thereof;
   means for adjusting the degree of transmission of said elements in response to the intensity of the incident radiation, said means producing a signal of a first logic level for maximum transmission, a signal of a second logic level for minimum transmission, and a signal of the second logic level and of varying pulse width for other degrees of transmission;
   an oscillator; and
   a plurality of switches, each liquid crystal element being connected to said oscillator through one of said switches, said switches being responsive to said means for adjusting such that the amount of incident radiation transmission through said elements is controlled.

2. The filter of claim 1 wherein said detectors responsive to the incident radiation include a plurality of photodetectors, said filter additionally comprising a multiplexer responsive to said photodetectors, a sample-and-hold circuit responsive to said multiplexer, and an analog to digital converter responsive to said sample-and-hold circuit.

3. The filter of claim 2 wherein said means for adjusting includes an input/output means, a microprocessor responsive through said input/output means to said analog to digital converter, and a latch responsive through said input/output means to said microprocessor for providing output signals for adjusting the degree of transmission of said elements.

4. The filter of claim 1 additionally comprising input detectors for conducting the incident radiation to said means responsive to the incident radiation and said plurality of elements.

5. The filter of claim 4 wherein said input means includes first and second objective lenses.

6. The filter of claim 1 additionally comprising means for amplifying the radiation transmitted through said elements and output means responsive to the amplified radiation.

7. The filter of claim 6 wherein said output means includes an eyepiece.

8. A method for controlling the transmission of radiation, comprising the steps of:
inputting incident radiation to a plurality of adjustable transmissive elements;
selectively driving said elements with an oscillatitn signal;
producing a signal representative of the intensity of the incident radiation; and
adjusting the degree of transmission of said elements in response to said signal representative of the intensity of the incident radiation by controlling the driving of said elements with a signal of a first logic level for maximum transmission, a signal of a second logic level for minimum transmission, and a signal of the second logic level and of variable pulse width for other levels of transmission, said signal of variable pulse width being in synchronism with said oscillation signal such that the amount of incident radiation transmitted through said elements is controlled.

* * * * *

UNITED STATES PATENT AND TRADEMARK OFFICE
CERTIFICATE OF CORRECTION

PATENT NO. : 4,724,311

DATED : February 9, 1988

INVENTOR(S) : Douglas Mechlenburg

It is certified that error appears in the above-identified patent and that said Letters Patent is hereby corrected as shown below:

Col. 3, line 1, delete "sample-andhold" and substitute therefor --sample-and-hold--.

Col. 8, line 5, delete "oscillatitn" and substitute therefor --oscillating--.

Col. 8, line 18, delete "oscillation" and substitute therefor --oscillating--.

Signed and Sealed this

Twelfth Day of July, 1988

*Attest:*

DONALD J. QUIGG

*Attesting Officer*  *Commissioner of Patents and Trademarks*